United States Patent
Rhee

(10) Patent No.: US 6,663,261 B1
(45) Date of Patent: Dec. 16, 2003

(54) MOISTURE RESISTANT FLOURESCENT LIGHT FIXTURE

(75) Inventor: Shin W. Rhee, Northridge, CA (US)

(73) Assignee: Thin-Lite Corporation, Camarillo, CA (US)

( * ) Notice: Subject to any disclaimer, the term of this patent is extended or adjusted under 35 U.S.C. 154(b) by 0 days.

(21) Appl. No.: 10/102,490

(22) Filed: Mar. 20, 2002

(51) Int. Cl.$^7$ ............................................... F21V 29/00
(52) U.S. Cl. ...................................................... 362/267
(58) Field of Search ................................. 362/267, 217, 362/223, 362, 374, 375, 92, 310, 329, 221, 222, 265

(56) References Cited

U.S. PATENT DOCUMENTS

| | | | |
|---|---|---|---|
| 2,262,157 A | | 11/1941 | Beals |
| 2,327,552 A | * | 8/1943 | Poehling ..................... 362/267 |
| 2,337,685 A | | 12/1943 | Schepmoes |
| 2,791,681 A | * | 5/1957 | Dunker et al. .............. 362/267 |
| 2,873,358 A | * | 2/1959 | Dunker ........................ 362/267 |
| 2,983,813 A | | 5/1961 | Pfaff, Jr. |
| 3,185,835 A | | 5/1965 | Muller et al. |
| 4,118,767 A | * | 10/1978 | Urbanek ..................... 362/267 |
| 4,323,954 A | * | 4/1982 | Florence ..................... 362/267 |
| 4,660,131 A | | 4/1987 | Herst et al. |
| 4,725,931 A | | 2/1988 | Bourdon |
| 5,012,395 A | | 4/1991 | Wettengel et al. |
| 5,171,085 A | | 12/1992 | Jackish |
| 5,735,596 A | * | 4/1998 | Daumueller ................ 362/267 |
| 5,902,035 A | * | 5/1999 | Mui ............................ 362/267 |
| 6,367,955 B1 | * | 4/2002 | Rhee ........................... 362/368 |

* cited by examiner

Primary Examiner—Sandra O'Shea
Assistant Examiner—Bao Truong
(74) Attorney, Agent, or Firm—Fulwider Patton Lee & Utecht, LLP

(57) ABSTRACT

A light fixture including a housing formed by a pan having parallel side walls terminating in mounting phalanges formed with O-ring rungs and further including retainer rails which engage the opposite side of a flexible lens to hold the lens against an O-ring in the O-ring runs to maintain a moisture resistant seal.

15 Claims, 3 Drawing Sheets

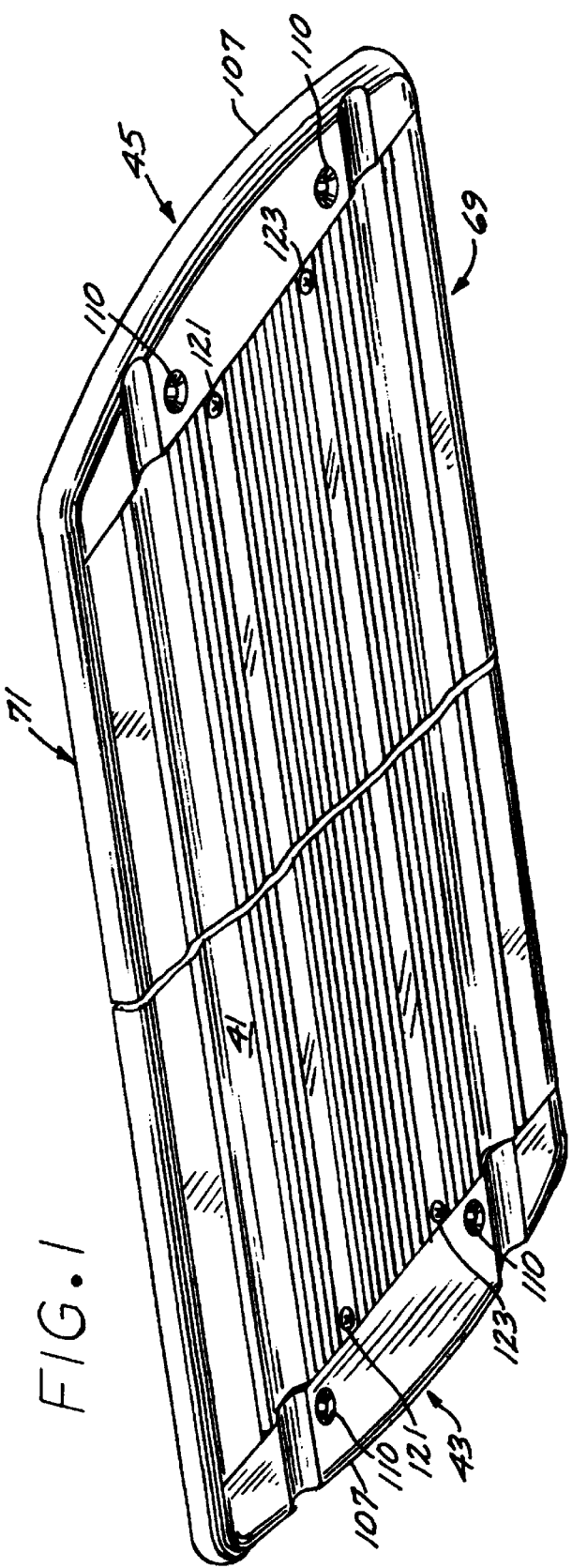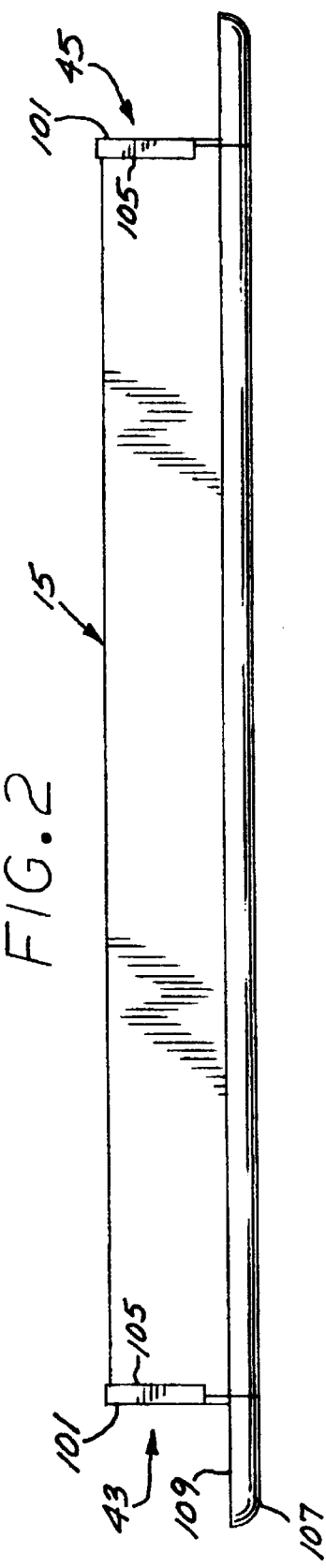

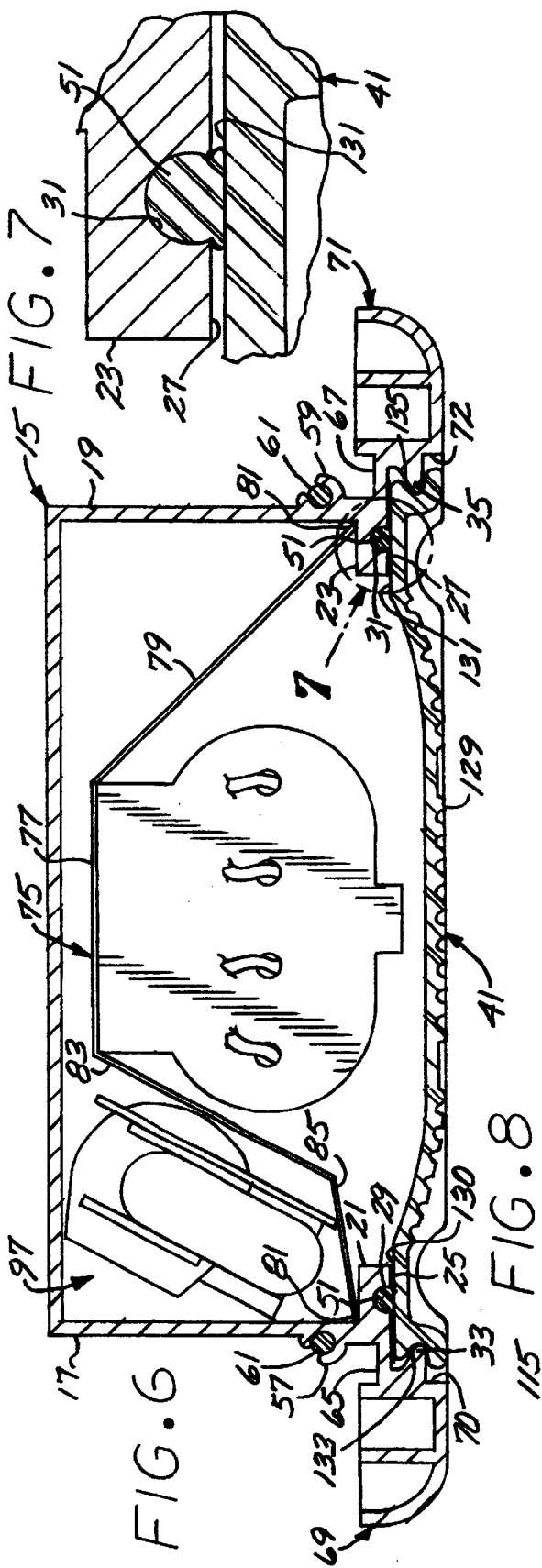
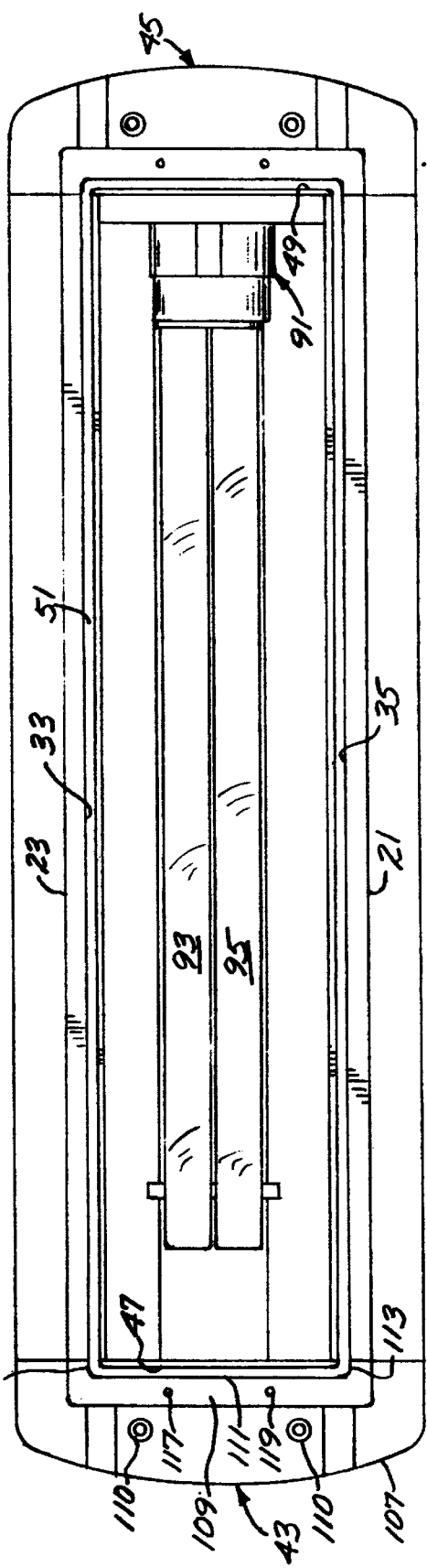

MOISTURE RESISTANT FLOURESCENT LIGHT FIXTURE

BACKGROUND OF THE INVENTION

1. Field of the Invention

The present invention relates to fluorescent light fixtures for use in a high moisture environment, such as refrigerated trucks, which might be regularly steam cleaned.

2. Description of the Prior Art

It has been known to make lighting fixtures with a generally rectangularly shaped pan to be recessed into the wall of a vehicle to be illuminated, such a device of this type is shown in U.S. Pat. No. 5,171,085 to Jackisch and assigned to the assignee of the subject patent application. Such devices, while enjoying commercial success, are not generally adaptable for use in a high moisture environment.

Fluorescent light fixtures have further been proposed for use in a high vapor environment. One such lighting fixture includes a frame secured to the perimeter of an opening in a wall for recess of the fixture and includes a channel shaped housing hingedly secured along one side to such frame and having a tubular gasket compressibly sandwiched between the parametrical flanges of such housing and an underlying lens. A device of this type is shown in U.S. Pat. No. 2,791,681 to Dunker. Such devices suffer the shortcoming that the lens is typically held in position pressed against the gasket only by means of spring clips thus failing to afford a high integrity moisture resistant seal.

SUMMARY OF THE INVENTION

The present invention includes a light fixture pan formed with opposed side walls formed on their free extremities with downwardly facing mounting surfaces. Formed in such mounting surfaces are O-ring glands which receive longitudinal runs of an endless O-ring. The side walls are formed with laterally in turned mounting rails which engage grooves in the opposite edges of a channel shaped lens which is configured to, when engaged with such rails, press sealingly against such longitudinal rungs of the O-ring.

BRIEF DESCRIPTION OF THE DRAWINGS

FIG. 1 is a broken bottom perspective view of a moisture resistant fluorescent light fixture embodying my new invention;

FIG. 2 is a front view thereof;

FIG. 6 is a transverse sectional view, in enlarged scale, of the light fixture shown in FIG. 1;

FIG. 7 is an enlarged in scale detailed view taken from the circle 7 in FIG. 6; and FIG. 8 is a bottom view, in reduced scale, of the light fixture shown in FIG. 1 with the lens removed.

DESCRIPTION OF THE PREFERRED EMBODIMENT

Figure 3:
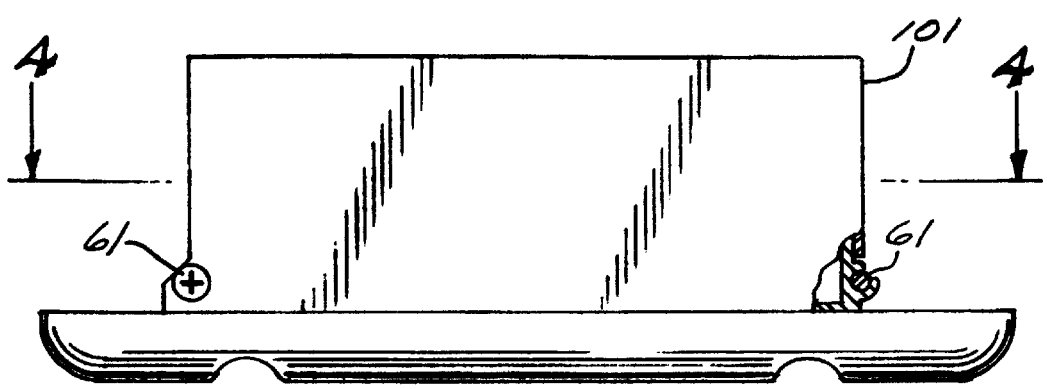
FIG. 3 is a right hand end view thereof, partially broken away.

Referring to FIGS. 1 and 6, the moisture resistant fluorescent light fixture of the present invention includes, generally, a housing defined by a channel shaped pan 15 formed with opposite downwardly projecting side walls 17 and 19 terminating at their lower extremities in respective mounting flanges 21 and 23. The respective mounting flanges 21 and 23 are formed with horizontal downwardly facing mounting surfaces 25 and 27 which are, in turn, formed with longitudinal O-ring gland runs 29 and 31. The side walls 17 and 19 flare laterally outwardly at the respective flanges 21 and 23 and then turn to project downwardly and form respective laterally inwardly turned mounting rails 33 and 35 which engage the opposite edges of a rectangularly shaped lens, generally designated 41. End caps, generally designated 43 and 45, are mounted to the opposite ends of the pan 15 and are formed with the respective O-ring glands 47 and 49 which cooperate with the respective longitudinal run 29 and 31 for receipt of an O-ring 31 which cooperates with the lens 41 to form a moisture tight seal.

Referring to FIGS. 3, 6 and 7, the pan 15 may be constructed of, for example, extruded aluminum or any other desired desirable material. For the purpose of illustration, the construction will be described as if the fixture were to be mounted in a horizontally extending ceiling panel. The respective side walls 17 and 19 are formed on their respective exterior sides with longitudinally extending screw races 57 and 59 for receipt of respective mounting screws 61 projecting through the end caps 43 and 45. The pan 15 may be mounted in a rectangular opening formed in the ceiling or the side wall of a refrigeration truck.

Referring to FIG. 6, their respective side walls 17 and 19 are formed at the lower extremities to flare laterally in opposite directions, the laterally inwardly turned flare forming the respective longitudinally extending horizontal flanges 21 and 23 and the outwardly projecting flares forming respective webs 65 and 67 which mount at the other extremities thereof longitudinally projecting bezels, 69 and 71. Such bezels 69 and 71 project downwardly and are formed on their respective laterally interior sides with upwardly raised recesses, 70 and 72 which are configured on their respective lateral interior sides with longitudinally, projecting, horizontal lips defining the respective rails 33 and 35. Such rails are spaced laterally outwardly from the vertical planes of the respective gland runs 29 and 31 and, also, spaced downwardly a predetermined distance from the respective mounting surfaces 25 and 27 to cooperate in recessing the lens 41 and forcing it into sealing engagement with the O-ring.

Referring to FIG. 6, a channel shaped reflector, generally designated 75, is trapped in the interior of the pan 15 and opens downwardly. The reflector 75 is of generally angular construction formed with a horizontal top wall 77 and a right hand side wall angling downwardly and outwardly at an angle of about 45 degrees to the vertical to terminate in a bottom edge 81 engaged above the mounting flange 23 to cooperate in holding the reflector 75 in position. The reflector 75 is further formed with a left hand side wall which includes an intermediate spring wall 83 angling downwardly and outwardly at an angle of about 30 degrees to the vertical and then turning laterally and outwardly to form a foot 85 angling laterally outwardly and downwardly at an angle of about 20 degrees to the horizontal to terminate in an edge 87 engaged behind the flange 21. The reflector 75 may be constructed of aluminum, coated plastic, or any other desired material for carrying the light fixtures and reflecting the light from the tubes downwardly.

Referring to FIGS. 6 and 8, mounted to the underside at one end of the reflector top wall 77 is a fluorescent light socket fixture, generally designated 91, into which the respective plugs at one end of a twin light assembly formed by two fluorescent light tubes 93 and 95 carried cantileverally from a plug. Referring to FIG. 6 mounted above the wall 85 of the reflector 75 and interposed between the spring wall 83 thereof and the side wall 17 of the pan, is the ballast and electrical circuit assembly, generally designated 97, for energizing the plug mounting the light tubes 93 and 95.

The respective end caps 43 and 45 are of similar construction and are essentially mirror images of one another. The end cap 43 includes a generally planer vertical end wall 101 (FIG. 3) for disposition in an abutting relationship with the adjacent end of the pan 15. Such end wall 101 flares slightly outwardly at the bottom extremity thereof to form respective ears formed with respective bores for receipt of respective mounting screws 61 that screw into the respective screw races 57.

Such end walls 101 are formed at the top and opposite sides with longitudinally inwardly turned stub walls 103 and 105 which are configured to be telescopically received over the respective opposite marginal ends of the pan.

Referring to FIG. 8, the end caps are formed at their respective bottom extremities with longitudinally outwardly flared bezels 107 which complementary join with the respective side bezels 69 and 71 on the opposite sides of the pan 15 and are further formed with laterally elongated upwardly recessed, downwardly facing mounting surfaces 109 which are formed to complement the transverse shape of the top side of the lens 41 (FIG. 8). Such caps are configured with respective C-shaped horizontally extending O-ring glands opening into the respective mounting surfaces 109 and are configured with respective lateral runs 111 which turned longitudinally at their opposite ends to form with their respective longitudinal stub glands 113 and 115 which, when the end caps are in position, align with the respective longitudinal runs 33 and 35 formed in the respective flanges 21 and 23. Formed in the respective laterally projecting mounting surfaces 109 are respective lens mounting bores 117 and 119 spaced laterally apart for receipt of respective mounting screws 121 and 123 projecting through laterally spaced bores in the opposite ends of the lens 41 and screwed into such bores themselves. The upward recess of the end cap mounting surfaces 109 cooperate with the upward recesses in the side bezels 69 and 71 to cooperate in forming a rectangular recess for the lens 41 to nest in.

Figure 4:
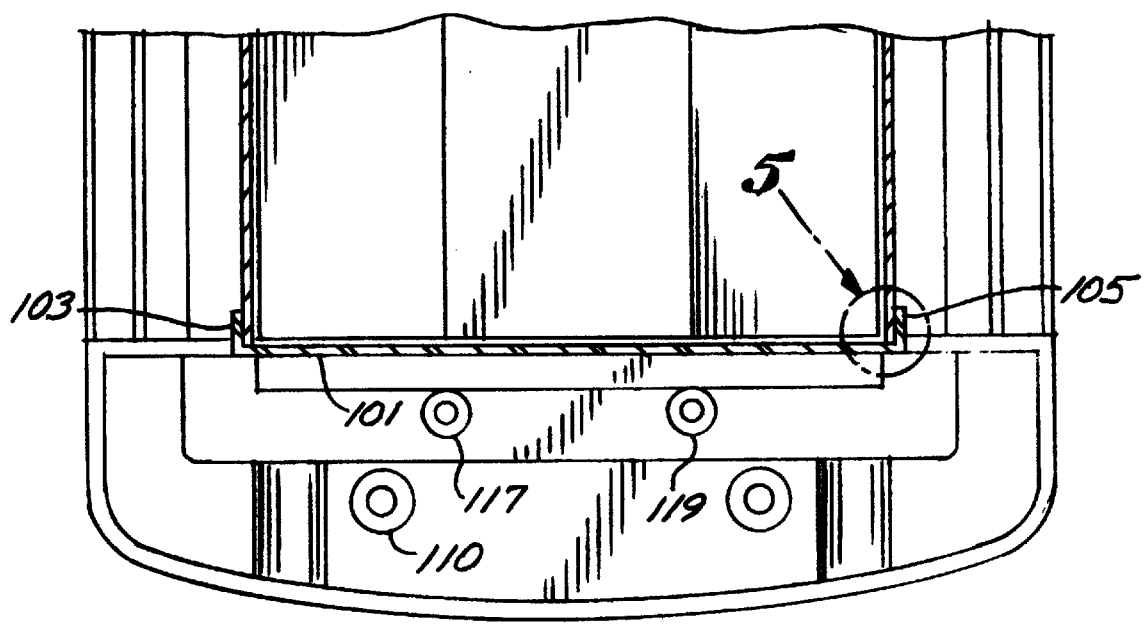
FIG. 4 is horizontal sectional view, in enlarged scale, taken along the lines 4—4 of FIG. 3.
Figure 5:
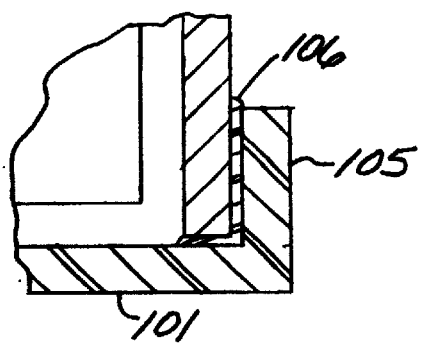
FIG. 5 is a detailed sectional view, in enlarged scale, taken from the circle designated 5 in FIG.4.

Referring to FIGS. 4 and 5, the junctures between the ends of the pan and the respective end caps are sealed by a sealing compound 106 or such other sealing gasket or material as may be desired to create a moisture resistant joint.

Referring to FIG. 6, the lens 41 is constructed of a fairly rigid, tough, impact resistant plastic about 1/8" thick and is somewhat channel shaped to be formed with a generally horizontal pane 129 which curves upwardly at the lateral opposite edges and is formed with laterally outwardly projecting flat lands 130 and 131 which are configured to press upwardly against the bottom sides of the longitudinal runs of the O-ring 51 as shown in FIG. 7. The lens is then formed at its opposite terminal edges with respective longitudinally extending bosses configured with outwardly opening grooves 133 and 135 spaced above the plane of pane 129 to engage the respective rails 33 and 35 to securely fasten the lens 41 in position with the lands 130 and 131 in tight sealing engagement compressing the O-ring.

During manufacturing, the moisture resistant light fixture of the present invention may be conveniently constructed from extruded aluminum to form the channel shaped pan 15. The reflector 75 may be formed of aluminum sheet metal bent to the channel shaped configuration shown in FIG. 6.

The end caps 43 and 45 may be molded to the desired configuration for complementary connection with the opposite ends of the pan 15. Such end caps may be joined to the respective opposite ends of the pan 15 at the juncture there between sealed by the compound 106. The screws 61 may be extended through the bores in the opposite walls 101 of the respective end caps and threaded into the respective screw races 57 and 59. The plugs fixture 91 may be riveted or otherwise fastened to the top wall 77 of the reflector.

The ballast and electrical circuit assembly 97 may be nested into the corner of the pan 15 adjacent to the side wall 17 and the reflector 77 conveniently introduced to such pan by flexing the respective side wall 79 and spring wall 83 to clear the lateral outer extremities of the respective mounting flanges 21 and 23 and nest the respective terminal edges 81 and 87 of the respective walls 79 and 85 in the position shown in FIG. 6 to resiliently hold the reflector in place capturing the balaced and circuit assembly 97 in position. The light tubes 93 and 95 may then be installed.

In some embodiments, the ballast and circuit assembly 97 is affixed to the spring wall 83 of the reflector by riveting or the like so as to form an interval of assembly for convenient inventorying, assembly, and shipping.

The lens 41 may conveniently be installed by merely clipping one of the grooves 133 or 135 over the respective retainer rail 33 or 35 and inserting the blade of a broad blade screw driver into the recess 71 or 72 (FIG. 6) at the other side of such lens to leverage that side lens toward the first to flex the central body of such lens sufficiently downwardly to allow such opposite side of the lens to clear the associated rail to be raised into position compressing the longitudinal runs of the O-ring and aligning the confronting rail. Such lens may then snap back into the position shown in FIG. 6 to be held firmly in position in compressing sealing engagement with the O-ring 51 as shown in FIG. 7. It is important that the lens have sufficient body and that the rails of the O-ring be so configured that by snapping the lens in place, a moisture resistant seal is created. The screws 121 and 123 may then be inserted through the lens and screwed into the respective bores 117 and 119 in the opposite end caps to likewise maintain a secure sealing engagement with the transverse rungs of the O-ring 51.

The light fixture of the present invention may conveniently be installed in rectangular opening cut in the side walls or top wall, for instance a refrigeration truck. The pan 15 may be recessed therein and the bezels 69, 71, and 107 will serve to overly the edges thereof. Mounting screws may be inserted through the mounting holes 110 of the end cap bezels to secure the fixture in position.

Then, when the truck is cleaned with, for instance high pressure water or steam, the light tubes 93 and 95 and associated circuitry and plugs will be protected from the moisture. The O-ring, being thoroughly compressed in place by the lens 41, will serve to form a high integrity barrier to entry of moisture or vapor. Likewise, the sealing compound or gasket material 106 (FIG. 5) at the end cap juncture will serve to seal out moisture. As will be apparent to those skilled in the art, the configuration of the mounting flanges, mounting rails, and lens may take many different forms, it only being important that the lens and rail combination cooperate to afford the sufficient compressive forces to, when such lens is locked in position, provide the desired water barrier.

In us, should the lens be accidentally impacted by a package of produce, meat or the like, the high impact plastic will resist fracture and the screw fasteners will resist separation from the pan.

When it is desirable to change a light tube assembly, the blade of a broad blade screw driver may be inserted into one or the other of the other of the recesses 70 or 72 adjacent the edge of the lens and that edge pried laterally inwardly relative to the respective bezels 69 or 71. With this prying, either the lens can flex to buckle somewhat in the lateral direction to clear the selected groove boss from the rail 33 or 35 or, in some embodiments, the bezels 69 or 71 will flex to accommodate such clearance. In other embodiments, it will be in combination of flexing between elements prying apart. In any event, once the rail on one side is cleared, the lens can be removed and access had to the tube assembly.

In the event it is necessary to access the ballast assembly 97, the technician can press the reflector 15, upwardly in the pan 15. In some embodiments, access can be had to the top side of the reflector 75 from clearance openings formed between one end or the other of the reflector and the corresponding end cap so the lower extremity of the spring wall 83 may be flexed laterally inwardly as the reflector is moved bodily to the right as viewed in FIG. 6 thus flexing the angular wall 79 so as to cooperate in creating clearance for the marginal edge 87 and the foot 85 to clear the innermost extent of the flange 21 for removal of such reflector. Access can then be had to the ballast assembly 97 for repair work or exchange.

After repair work is completed, the reflector may be re-installed as during the assembly stage and the lens 41 then again attached to maintain the compressive sealing barrier described above.

From the foregoing it would be appreciated if the moisture resistant light fixture of the present invention is economical to manufacture, convenient to assemble and install, while providing for resistance to penetration therein of moisture that as might be the case for refrigerated trucks which are cleaned periodically with high pressure water and even sometimes steam.

What is claimed is:

1. A moisture resistant fluorescent light fixture comprising:
   a channel shaped pan for mounting light tube sockets and formed with side walls spaced laterally apart to form therebetween a downwardly opening window and configured with respective parallel mounting flanges defining respective horizontal facing mounting surfaces, said flanges formed with respective longitudinal O-ring glands opening downwardly into said surfaces;
   said side walls further projecting downwardly on the laterally outer sides of the respective said mounting surfaces and configured with laterally inwardly projecting longitudinal mounting rails;
   a pair of end caps fastened to the opposite ends of said pan and formed with respective end cap mounting surfaces, said end caps further formed with C-shaped in plan O-ring glands projecting transversely and turning longitudinally to terminate in respective longitudinal gland segments aligned with the respective ends of the longitudinal O-ring glands;
   an endless O-ring received in said glands and projecting downwardly from the respective mounting surfaces;
   a lens configured to cover said window and formed along with lateral edges defining respective laterally outwardly opening grooves removably engaged with the respective said rails; and
   said lens further including an upwardly facing boarder defining lands configured to sealingly engage the respective longitudinal runs of said O-ring.

2. A moisture resistant light fixture set forth in claim 1 that includes:
   a sealing compound interposed between said end caps and opposite ends of said pan.

3. A moisture resistant fluorescent light fixture set forth in claim 1 wherein:
   said end caps are formed with downwardly opening bores; and
   said lens is formed on the opposite ends with laterally spaced apart bores for receipt of screws to screw into said mounting bores.

4. The moisture resistant fluorescent light fixture set forth claim 1 wherein:
   said pan is configured with said side walls formed on their respective lower extremities with laterally in turned strips defining the respective said mounting flanges.

5. The moisture resistant fluorescent light fixture set forth in claim 1 wherein:
   said pan is constructed of extruded metal.

6. The moisture resistant fluorescent light fixture set forth in claim 1 wherein:
   said pan is constructed of one piece.

7. The moisture resistant fluorescent light fixture set forth in claim 1 wherein:
   said lens is configured centrally with a body bowed downwardly relative to the laterally opposite edges of said lens.

8. The moisture resistant fluorescent light fixture set forth in claim 1 wherein:
   said side walls are formed with said flanges projecting laterally inwardly toward one another, said fixture further includes:
   a channel shaped reflector configured with a top wall and downwardly and outwardly sloped side walls configured with terminal edges to engaged behind the respective said flanges, said reflector being sufficiently resilient and so configured as to be flexed to compress said terminal edges toward one another to clear the said flanges for insertion of said reflector into said pan.

9. The moisture resistant fluorescent light fixture set forth in claim 1 that includes:
   a channel shaped flexible reflector including a top and opposite side walls, said reflector configured to be complimentary received within said pan and engage the opposite side walls thereof, one of said reflector side walls being spaced from the corresponding side wall of said pan to cooperate with said pan to form a ballast assembly compartment;
   and a ballast assembly for receipt in said ballast assembly compartment.

10. A moisture resistant fluorescent light fixture comprising:
    a housing body formed with downwardly projecting side and end walls, configured at their lower extremities with mounting forming downwardly facing side and end mounting surfaces, said flanges being formed with an endless O-ring gland having longitudinal and transverse runs and opening downwardly;
    an O-ring received in said gland;
    said housing further including opposite sides formed with retainer elements projecting downwardly below the side mounting surfaces and formed with respective inwardly turned mounting rails spaced horizontally below the plane of said side mounting surfaces; and a flexible lens including opposite extremities formed with respective longitudinal lands to engage the respective longitudinal runs of said O-ring and further configured along said opposite extremities with laterally outwardly opening mounting grooves for engaging respective said rails and so configured as to, when so engaged, sealingly engage said lands with the respective said longitudinal runs of said O-ring.

11. A moisture resistant fluorescent light fixture comprising:

an elongated channel shaped pan formed with a top wall and downwardly projecting side walls, said side walls being formed at their lower extremities with mounting flange means formed with downwardly opening longitudinal O-ring glands;

an O-ring including longitudinal runs in the respective said longitudinal glands;

a flexible lens formed from resilient plastic and including opposite sides configured with upwardly facing land surfaces for sealingly engaging said longitudinal runs;

said lens further including opposite edges configured with boss means formed with laterally outwardly opening grooves for engaging said rails to maintain said land surfaces in said sealing engagement with said longitudinal runs of said O-ring.

12. The moisture resistant fluorescent light fixture of claim 11 that includes:

end caps mounted to the opposite ends of said pan and configured in their respective lower extremities with mounting surfaces configured to complement the shape of the top side of said lens;

the respective said end caps further including transverse O-ring glands formed at their laterally opposite extremities with longitudinally extending O-ring glands lined with the respective opposite ends of the respective said longitudinal O-ring glands; and said O-ring including transverse runs received in the respective said transverse glands.

13. The moisture resistant fluorescent light fixture of claim 11 wherein:

said lens is formed with an elongated central window spaced vertically downwardly from the plane including said rails.

14. The moisture resistant fluorescent light fixture set forth in claim 12 that includes:

moisture resistant seals interposed between said end caps at the respective opposite ends of said pan.

15. The moisture resistant fluorescent light fixture set forth in claim 12 wherein:

said lens is rectangularly shaped and in plane view; and said pan and end caps are formed in their respective lower extremities with respective recesses cooperating to form a rectangularly shaped recess for upward recessing therein of said lens.

* * * * *